(12) United States Patent
Kaneko et al.

(10) Patent No.: US 11,472,354 B2
(45) Date of Patent: Oct. 18, 2022

(54) VEHICLE CONTROLLER

(71) Applicant: Hitachi Automotive Systems, Ltd., Hitachinaka (JP)

(72) Inventors: Shuhei Kaneko, Hitachinaka (JP); Kenichi Osada, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 448 days.

(21) Appl. No.: 16/612,666

(22) PCT Filed: Jun. 19, 2018

(86) PCT No.: PCT/JP2018/023193
§ 371 (c)(1),
(2) Date: Nov. 11, 2019

(87) PCT Pub. No.: WO2018/235790
PCT Pub. Date: Dec. 27, 2018

(65) Prior Publication Data
US 2020/0094755 A1 Mar. 26, 2020

(30) Foreign Application Priority Data
Jun. 22, 2017 (JP) .............................. JP2017-122602

(51) Int. Cl.
*B60R 16/023* (2006.01)
*G06F 1/26* (2006.01)
(Continued)

(52) U.S. Cl.
CPC .............. *B60R 16/023* (2013.01); *G06F 1/26* (2013.01); *G06F 9/4418* (2013.01); *G06F 13/4027* (2013.01)

(58) Field of Classification Search
CPC ....... B60R 16/023; G06F 1/26; G06F 9/4418; G06F 13/4027; G06F 1/266;
(Continued)

(56) References Cited

U.S. PATENT DOCUMENTS 5,216,674 A * 6/1993 Peter ....................... H04L 25/02
361/88
6,070,539 A * 6/2000 Flamme .............. A01M 7/0089
701/50

(Continued)

FOREIGN PATENT DOCUMENTS

JP  2014-165746 A  9/2014
JP  2015-199444 A  11/2015
(Continued)

OTHER PUBLICATIONS

International Search Report with English translation and Written Opinion issued in corresponding application No. PCT/JP2018/023193 dated Sep. 25, 2018.

*Primary Examiner* — Faisal M Zaman
(74) *Attorney, Agent, or Firm* — Foley & Lardner LLP (57) ABSTRACT

Provided is a vehicle controller that can suppress increase in startup time due to increase in the number of function portions related to communication. The invention includes a power supply unit 3 that is capable of supplying or shutting off operating power to a microcomputer 2 that communicates with other electronic control units through CAN channels (CAN1, CAN2), and communication controllers 4 and 6 that are respectively provided in the multiple CAN channels (CAN 1, CAN 2) used for communication of the microcomputer 2. When the communication controller 4 receives a control start instruction signal instructing activation of the microcomputer 2 through the CAN channel (CAN1) related to the communication controller 4, the communication controller 4 switches the state of the com- (Continued)

munication controller 4 from a standby state with a limited function to an operating state, transmits a power source activation instruction signal instructing switching of the supply state of operating power to the microcomputer 2 from supply to shut-off to the power supply unit 3, and outputs a communication start instruction signal instructing switching from the standby state to the operating state to the communication controller 6.

3 Claims, 12 Drawing Sheets

(51) Int. Cl.
*G06F 9/4401* (2018.01)
*G06F 13/40* (2006.01)

(58) Field of Classification Search
CPC .... G06F 1/3209; G06F 1/3287; G06F 1/3253; G06F 1/30; G06F 1/3203; G06F 1/3243; G06F 1/3296; Y02D 10/00; Y02D 30/50
USPC ................................ 713/310, 324, 320, 323
See application file for complete search history.

(56) References Cited

U.S. PATENT DOCUMENTS

| | | | |
|---|---|---|---|
| 6,747,498 B1* | 6/2004 | Pauletti | H04L 12/40032 327/333 |
| 9,906,421 B2* | 2/2018 | Ikegami | H04L 43/0811 |
| 11,126,240 B2* | 9/2021 | Kim | G06F 1/3287 |
| 2003/0230443 A1* | 12/2003 | Cramer | B62D 21/152 180/65.51 |
| 2006/0211400 A1* | 9/2006 | Bauman | H04M 11/007 455/343.1 |
| 2007/0091497 A1* | 4/2007 | Mizuno | G11B 20/1816 714/E11.163 |
| 2010/0036546 A1* | 2/2010 | Gomes | B60R 25/257 701/1 |
| 2014/0241370 A1* | 8/2014 | Itou | H04L 45/04 370/396 |
| 2016/0065298 A1 | 3/2016 | Nakagawa | |
| 2020/0369225 A1* | 11/2020 | Kominato | H04B 10/1143 |

FOREIGN PATENT DOCUMENTS

| | | |
|---|---|---|
| JP | 2016-048848 A | 4/2016 |
| JP | 2017-061166 A | 3/2017 |

\* cited by examiner

VEHICLE CONTROLLER

TECHNICAL FIELD

The present invention relates to a vehicle controller that controls a vehicle.

BACKGROUND ART

Multiple electronic control units (hereinafter referred to as ECUs) are mounted on a vehicle and installed in various places in the vehicle. The multiple ECUs cooperate with each other to implement one application. For this reason, the ECUs are connected by a communication line to form a network, and data communication is performed among the ECUs. Since these ECUs are installed in various places in the vehicle, one in-vehicle network is configured by relaying communication between different networks configured for each installation place by an in-vehicle gateway device. CAN is widely used as a predominant communication protocol of in-vehicle networks.

Additionally, in recent years, the number of CAN channels in in-vehicle gateway devices and ECUs has increased. Hence, a configuration using a system base chip (SBC) in which a power supply and one or more CAN transceivers are integrated into one chip, or a configuration of adding CAN transceivers for the number of channels lacking when the number of channels in CAN cannot be covered with one SBC, for example, has been used.

A technique described in PTL 1 has been known as an example of the above technique including one or more CAN interfaces. PTL 1 discloses an electronic control unit that communicates with another control unit through a communication bus, the electronic control unit including a communication controller and a transceiver connected to each other through a transmission line and a reception line, and a storage that stores a received signal received by the transceiver as wakeup data when the electronic control unit is operating in a sleep mode which is an operating state with less power consumption than a normal mode which is a normal operating state. The transceiver sends a transmission signal input from the communication controller through the transmission line to the communication bus and outputs a reception signal received from the communication bus to the communication controller through the reception line, and when the wakeup data is received from the transceiver, the communication controller starts transitioning from the sleep mode to the normal mode, and after transitioning to the normal mode, acquires the wakeup data from the storage to determine whether the wakeup data is appropriate.

CITATION LIST

Patent Literature

PTL 1: JP 2015-199444 A

SUMMARY OF INVENTION

Technical Problem

However, in the configuration in which multiple control function portions having a CAN communication function such as an SBC and a CAN transceiver are combined as in the above conventional technique, when a wakeup frame by CAN communication is input to one control function portion, for example, an activation detector outputs an activation instruction to a power supply unit, a microcomputer activated by power supply from the power supply unit outputs the activation instruction to another control function portion, and the other control function portion is activated. That is, it is necessary to wait for startup of the microcomputer between the activation of the control function portion having received the activation signal by CAN communication and the activation of another control function portion. This has lead to a problem that it takes time to activate other control function portions.

The present invention has been made in view of the foregoing, and aims to provide a vehicle controller that can suppress increase in startup time due to increase in the number of function portions related to communication.

Solution to Problem

In order to achieve the above objective, the present invention includes: an electronic control unit that communicates with other electronic control units through multiple channels; a power supply unit that is capable of supplying or shutting off operating power to the electronic control unit; and multiple communication controllers that are provided in the respective multiple channels used for communication of the electronic control unit and control each communication related to the channels of the electronic control unit. When a first communication controller which is one of the multiple communication controllers receives a control start instruction signal instructing activation of the electronic control unit through a channel related to the first communication controller, the first communication controller switches a state of the first communication controller from a standby state with a limited function to an operating state, transmits, to the power supply unit, a power source activation instruction signal instructing switching of a supply state of the operating power to the electronic control unit from shut-off to supply, and outputs a communication start instruction signal instructing switching from the standby state to the operating state to another communication controller different from the first communication controller among the multiple communication controllers.

Advantageous Effects of Invention

According to the present invention, the stability of adaptive cruise control can be further improved.

DESCRIPTION OF EMBODIMENTS

First Embodiment

Hereinafter, a first embodiment of the present invention will be described with reference to the drawings.

Figure 1:
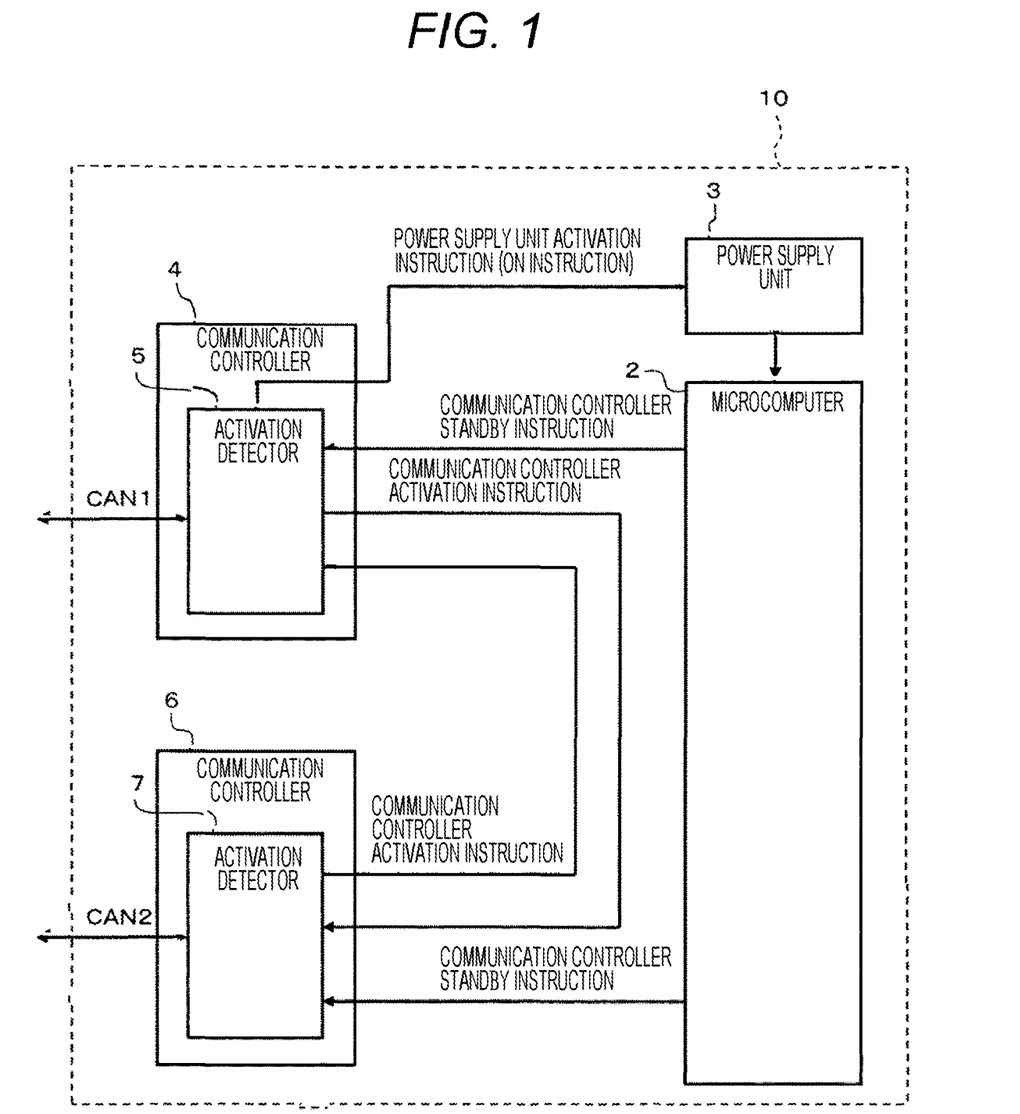
FIG. 1 is a functional block diagram schematically showing an overall configuration of a vehicle controller according to a first embodiment.

FIG. 1 is a functional block diagram schematically showing an overall configuration of a vehicle controller according to the embodiment.

In FIG. 1, a vehicle controller 10 is generally configured of a microcomputer (electronic control unit) 2 that communicates with other electronic control units (not shown) through multiple (e.g., two) CAN channels (CAN1, CAN2), a power supply unit 3 capable of supplying or cutting off operating power to the microcomputer 2, and multiple (e.g., two) communication controllers 4 and 6 respectively provided in the multiple CAN channels (CAN1, CAN2) used for communication of the microcomputer 2 to respectively control communication related to the CAN channels (CAN1, CAN2) of the microcomputer 2. Note that power necessary for an operating state or a standby state (sleep state) is supplied to the power supply unit 3 and the communication controllers 4 and 6 from a higher-level power supply unit (not shown).

The communication controller 4 controls communication of the microcomputer 2 through the CAN channel (CAN1), and the microcomputer 2 communicates with another electronic control unit connected to the CAN channel (CAN1) through the active communication controller 4. The communication controller 4 has an activation detector 5 that detects a control start instruction signal (wakeup frame) input to the communication controller 4 from the CAN channel (CAN 1), and a communication controller activation instruction signal (communication start instruction signal) input to the communication controller 4 from the communication controller 6.

When the activation detector 5 detects reception of a control start instruction signal instructing activation of the microcomputer 2 through the CAN channel (CAN1) in a standby state, the activation detector 5 switches the state of the communication controller 4 from the standby state (sleep state) with a limited function to the operating state, transmits a power supply unit activation instruction signal (power source activation instruction signal) instructing switching of the supply state of operating power to the microcomputer 2 from shut-off to supply to the power supply unit 3, and also outputs a communication controller activation instruction signal (communication start instruction signal) instructing switching from a standby state to an operating state to the other communication controller 6.

Additionally, when the communication controller activation instruction signal (communication start instruction signal) is input from the activation detector 7 of the communication controller 6 in a standby state, the activation detector 5 switches the state of the communication controller 4 from the standby state (sleep state) to the operating state, and transmits a power supply unit activation instruction signal (power source activation instruction signal) instructing switching of the supply state of operating power to the microcomputer 2 from shut-off to supply to the power supply unit 3.

Additionally, when the activation detector 5 detects a communication controller standby instruction signal (communication standby instruction signal) from the microcomputer 2, the activation detector 5 transmits a power supply unit shut-off instruction signal (power source shut-off instruction signal) instructing switching of the supply state of operating power to the microcomputer 2 from supply to shut-off to the power supply unit 3 to shut off the supply of operating power from the power supply unit 3 to the microcomputer 2, and switches the communication controller 4 to a standby state. Note that the power supply unit activation instruction signal (power source activation instruction signal) instructs supply of operating power from the power supply unit 3 to the microcomputer 2 by changing the signal level from OFF (Lo level) to ON (Hi level) and maintaining ON. Note that outputting the power supply unit shut-off instruction signal (power source shut-off instruction signal) means changing the signal level of the power supply unit activation instruction signal (power source activation instruction signal) from ON (Hi level) to OFF (Lo level) and maintaining OFF. This instructs the power supply unit 3 to switch the supply state of operating power to the microcomputer 2 from supply to shut-off.

The communication controller 6 controls communication of the microcomputer 2 through the CAN channel (CAN 2), and the microcomputer 2 communicates with another electronic control unit connected to the CAN channel (CAN 2) through the active communication controller 6. The communication controller 6 has an activation detector 7 that detects a control start instruction signal (wakeup frame) input to the communication controller 6 from the CAN channel (CAN 2), and a communication controller activation instruction signal (communication start instruction signal) input to the communication controller 6 from the communication controller 4.

When the activation detector 7 detects reception of a control start instruction signal instructing activation of the microcomputer 2 in a standby state, the activation detector 7 switches the state of the communication controller 6 from the standby state (sleep state) with a limited function to the operating state, and outputs a communication controller activation instruction signal (communication start instruction signal) to the communication controller 4. Additionally, when the activation detector 7 detects a communication controller standby instruction signal (communication standby instruction signal) from the microcomputer 2, the activation detector 7 switches the communication controller 6 to a standby state. Note that the activation detector 7 transmits the communication controller standby instruction signal (communication standby instruction signal) to the communication controller 4 to switch the level of the communication controller activation instruction signal (communication start instruction signal) output to the communication controller 6 from ON (Hi level) to OFF (Lo level), and thereby switches the communication controller 6 to the standby state.

Figure 2:
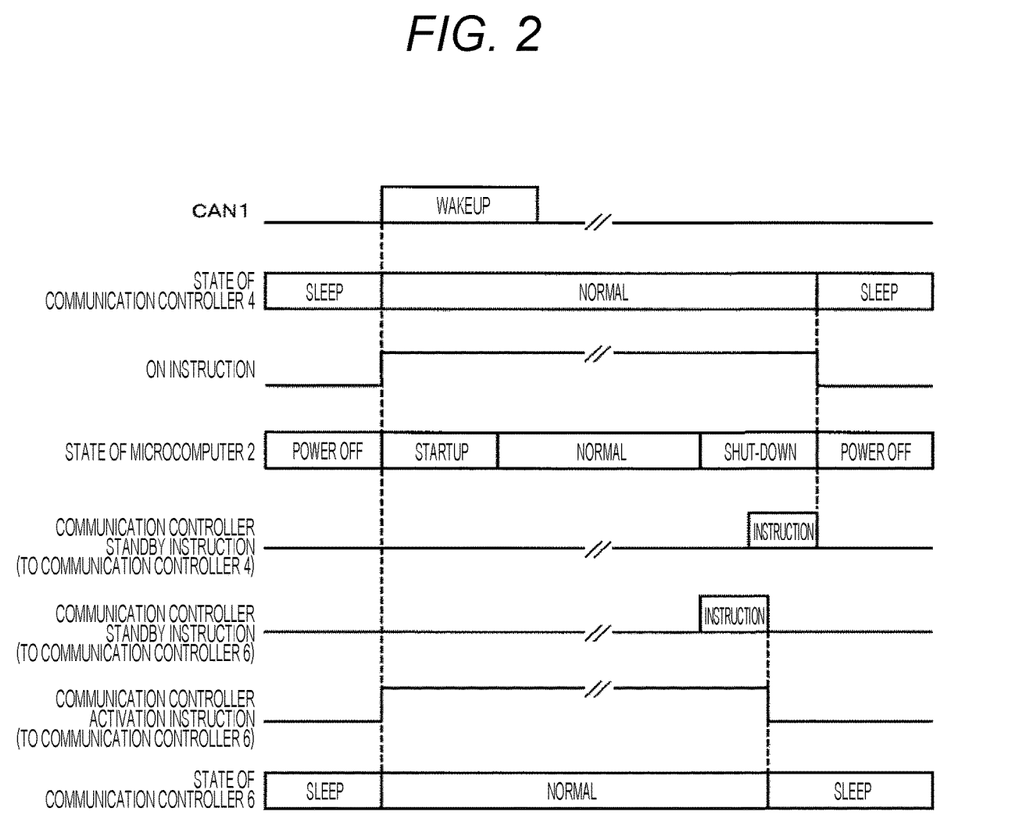
FIG. 2 is a timing chart showing an example of an operating state of the vehicle controller according to the first embodiment.

FIG. 2 is a timing chart showing an example of an operating state of the vehicle controller according to the embodiment. FIG. 2 exemplifies an operating state when the control start instruction signal is input to the communication controller 4.

As shown in FIG. 2, when the control start instruction signal (wakeup frame) from the CAN channel (CAN1) is detected by the communication controller 4, the communication controller 4 is switched from the standby state (sleep state) to the active state (normal state), outputs a power supply unit activation instruction signal (ON instruction signal) to the power supply unit 3, and outputs a communication controller activation instruction signal to the communication controller 6. As a result, the microcomputer 2 transitions from the power-off state to the active state (normal state) after finishing the startup state, and the communication controller 6 switches from the standby state to the active state. Additionally, when the microcomputer 2 transitions from the active state to the standby state, the microcomputer 2 enters a shut-down state, outputs a communication controller standby instruction to the communication controller 6 to switch the communication controller 6 to a standby state. Then, the microcomputer 2 outputs a communication controller standby instruction to the communication controller 4 later than that to switch the communication controller 4 to a standby state, and changes the power supply unit activation instruction signal (ON instruction signal) to OFF (Lo level) to power off the microcomputer 2.

The operation and effect of the embodiment configured as described above will be described in comparison with the conventional technique as a comparative example.

Figure 11:
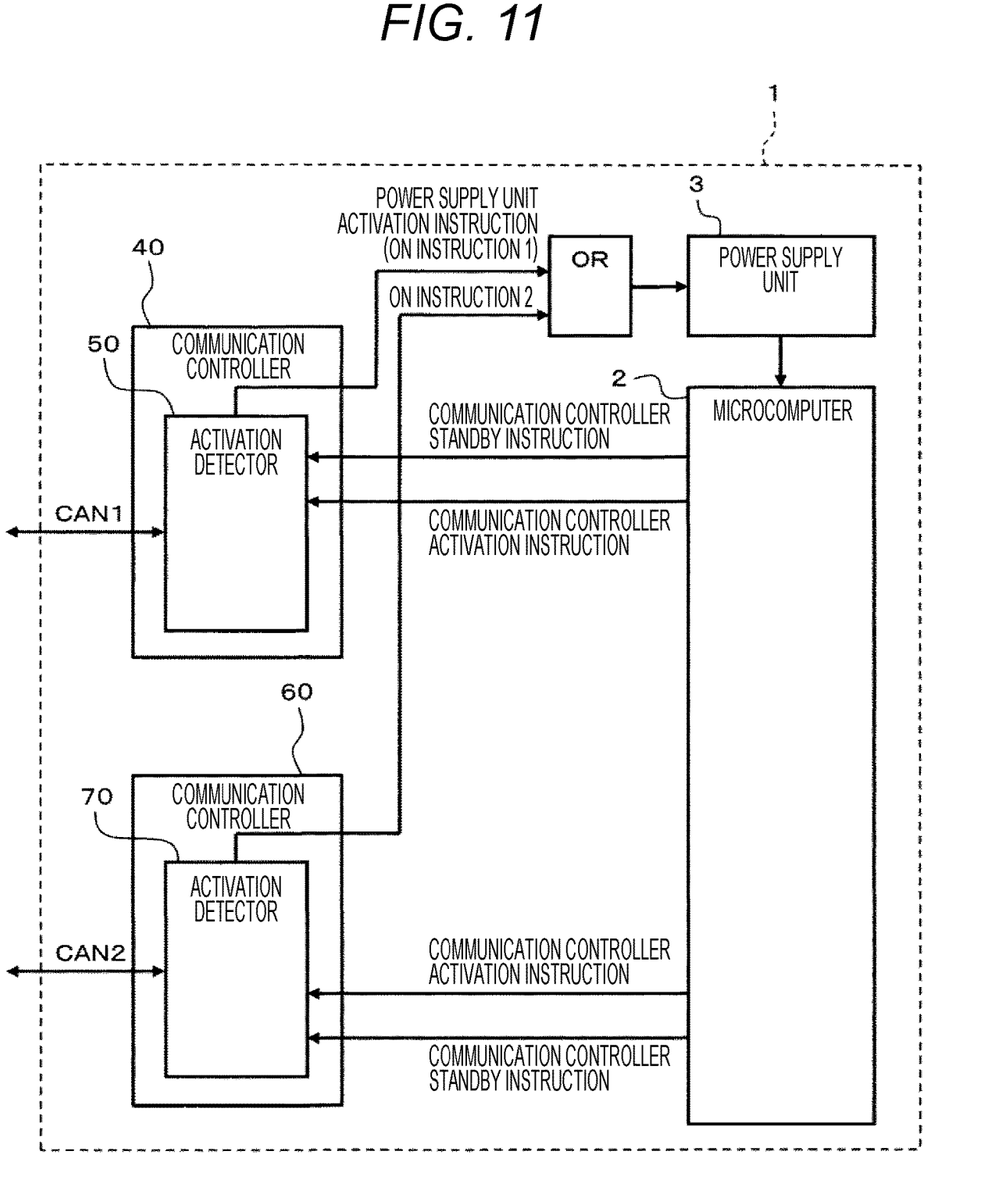
FIG. 11 is a functional block diagram schematically showing an overall configuration of a vehicle controller of a comparative example.

FIG. 11 is a functional block diagram schematically showing an overall configuration of a vehicle controller of a comparative example. Additionally, FIG. 12 is a timing chart showing an example of an operating state of the vehicle controller of the comparative example.

Figure 12:
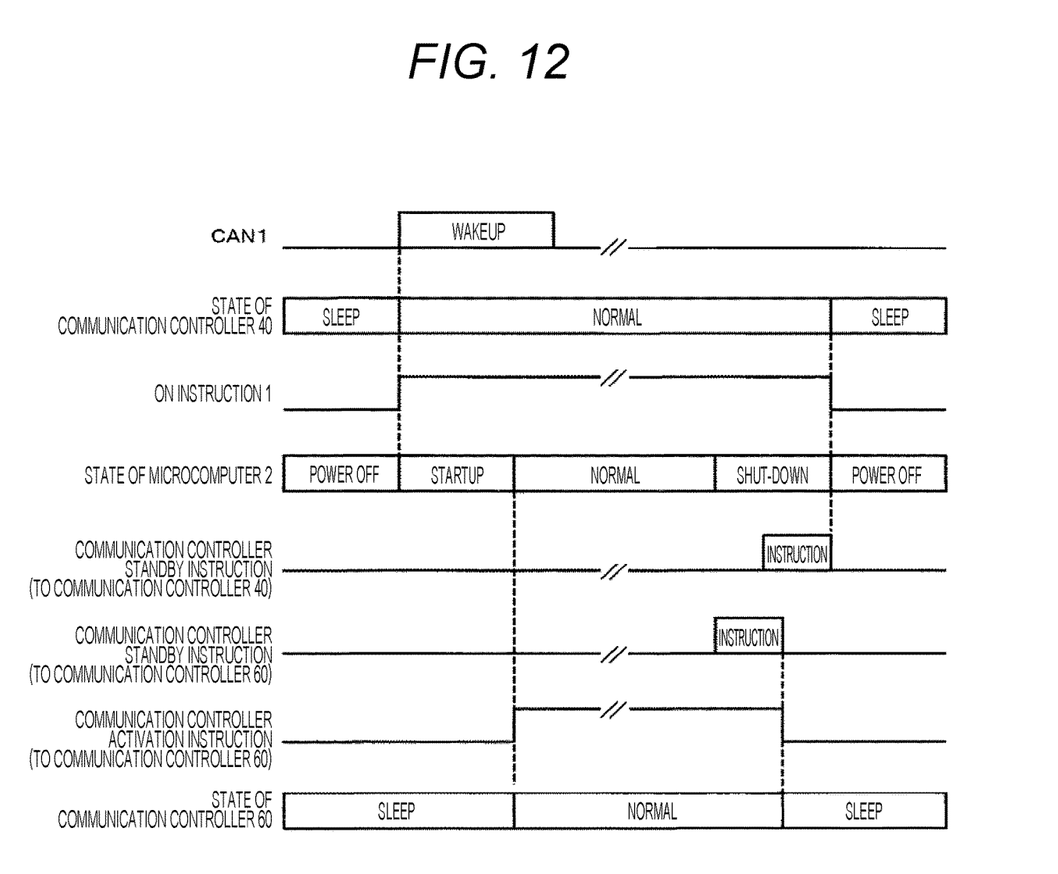
FIG. 12 is a timing chart showing an example of an operating state of the vehicle controller of the comparative example.

As in the conventional technique as the comparative example shown in FIGS. 11 and 12, in a configuration in which multiple communication controllers 40 are combined, when a wakeup frame by CAN communication (CAN1) is input to one communication controller 40, for example, an activation detector 50 outputs an activation instruction (ON instruction 1) to a power supply unit 3, and a microcomputer 2 activated by being supplied with power from the power supply unit 3 outputs an activation instruction to a communication controller 60, whereby the communication controller 60 is activated. That is, it is necessary to wait for startup of the microcomputer 2 between the activation of the communication controller 40 having received the activation signal by CAN communication and the activation of the communication controller 60. This has lead to a problem that it takes time to activate the communication controller 60.

On the other hand, the embodiment includes: the microcomputer 2 that communicates with other electronic control units through multiple CAN channels (CAN1, CAN2); the power supply unit 3 that is capable of supplying or shutting off operating power to the microcomputer 2; and the communication controllers 4 and 6 that are respectively provided in the multiple CAN channels (CAN 1, CAN 2) used for communication of the microcomputer 2 and respectively controlling communication related to the channels of the microcomputer 2. When the communication controller 4, which is one of the communication controllers 4 and 6, receives a control start instruction signal instructing activation of the microcomputer 2 through the CAN channel (CAN1) related to the communication controller 4, the communication controller 4 is configured to switch the state of the communication controller 4 from a standby state with a limited function to an operating state, transmit a power source activation instruction signal instructing switching of the supply state of operating power to the microcomputer 2 from supply to shut-off to the power supply unit 3, and output a communication start instruction signal instructing switching from the standby state to the operating state to the communication controller 6, which is the communication controller other than the communication controller 4 of the multiple communication controllers 4 and 6. Hence, the communication controller 6 can be activated promptly without waiting for completion of startup of the microcomputer 2. This can suppress increase in startup time due to increase in the number of function portions related to communication.

Figure 3:
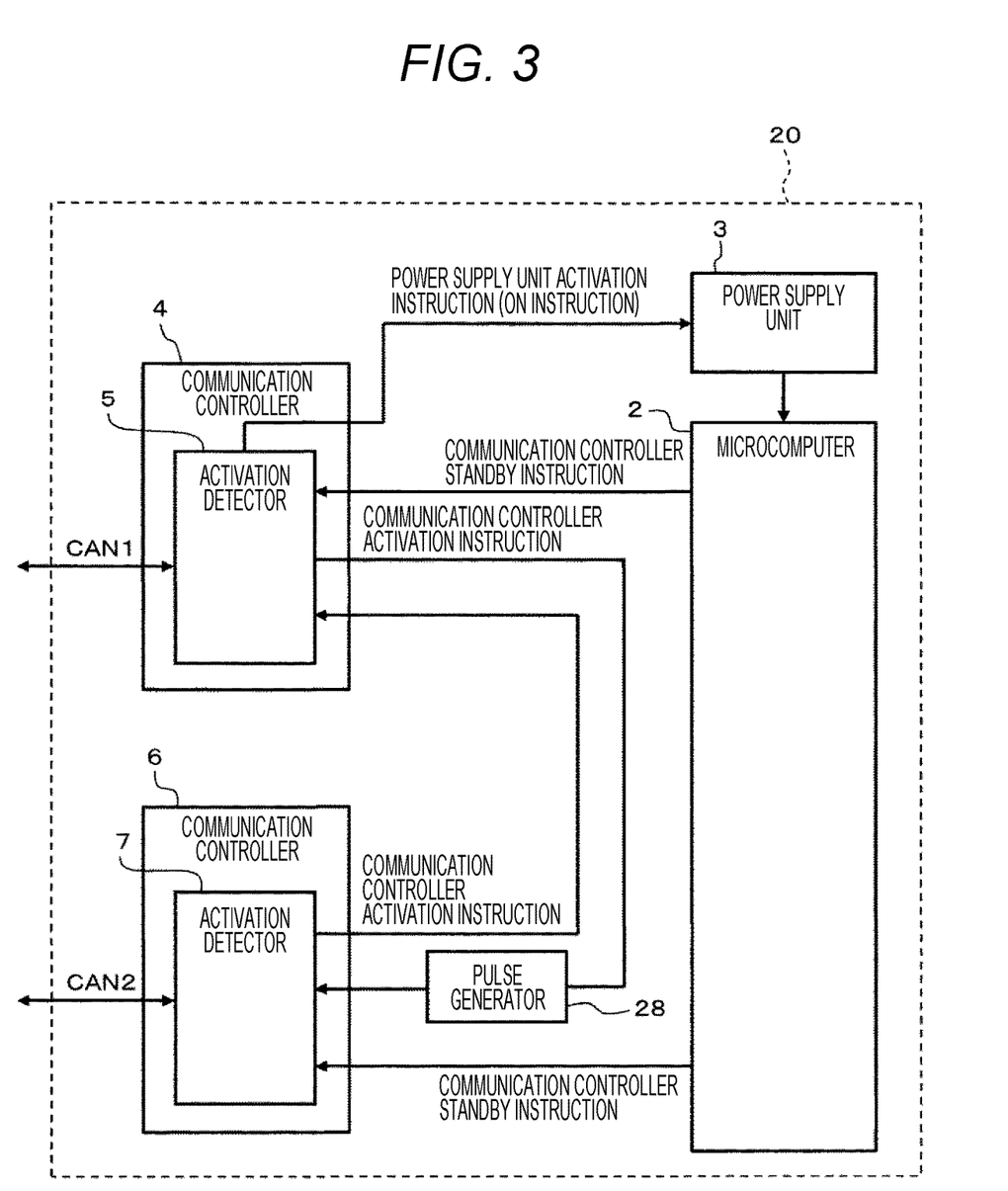
FIG. 3 is a functional block diagram schematically showing an overall configuration of a vehicle controller according to a modification of the first embodiment.
Figure 4:
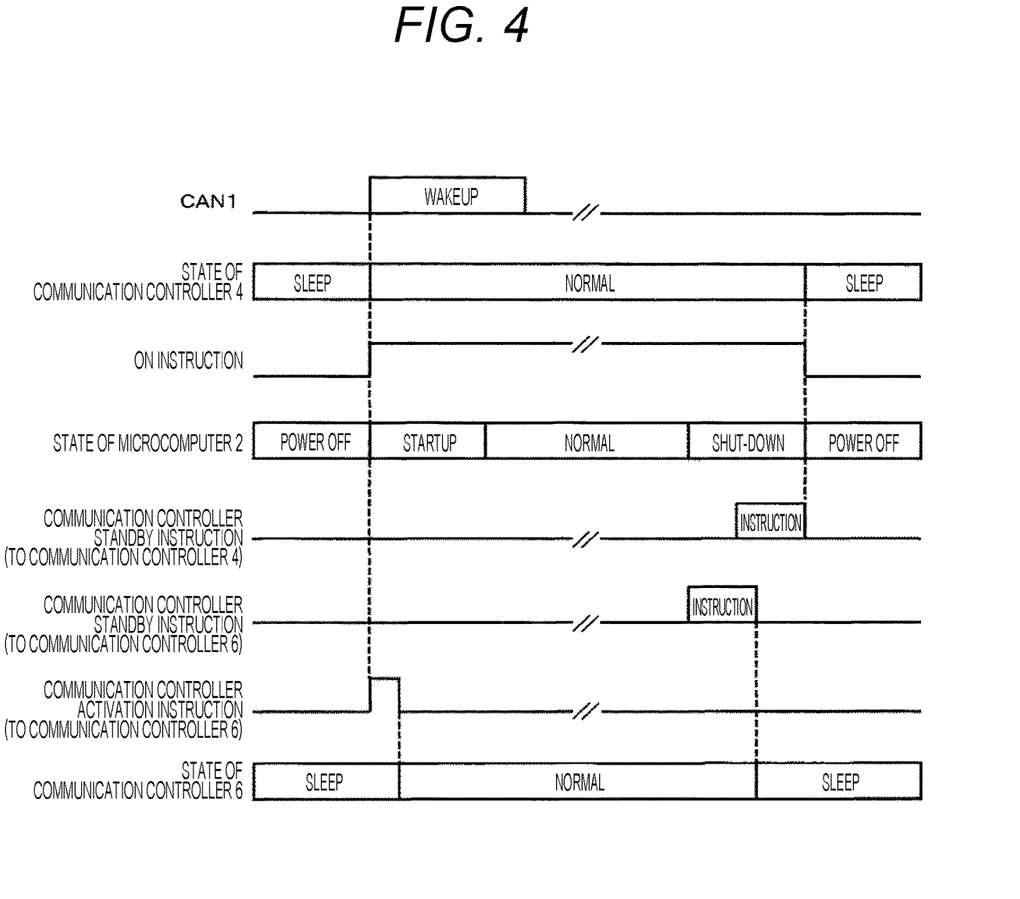
FIG. 4 is a timing chart showing an example of an operating state of the vehicle controller according to the modification of the first embodiment.

Note that in the embodiment, the case where the activation detector 7 of the communication controller 6 detects the ON (Hi state) and OFF (Lo state) of the level of the communication start instruction signal has been described as an example. However, in a case where the activation detector 7 is of the falling edge detection scheme, as in a modification shown in FIGS. 3 4, a pulse generation circuit 8 may be provided in the channel for transmitting the communication start instruction signal from the activation detector 5 of the communication controller 4 to the activation detector 7 of the communication controller 6, and a pulse signal generated on the basis of the communication start instruction signal from the activation detector 5 may be detected by the activation detector 7.

First Example

A first example of the present invention will be described with reference to FIGS. 5 and 6. In the example, only differences from the first embodiment will be described, and in the drawings used in the example, members similar to those of the first embodiment are denoted by the same reference numerals, and the description will be omitted.

The example shows a configuration example using multiple (e.g., two) system base chips (SBCs).

Figure 5:
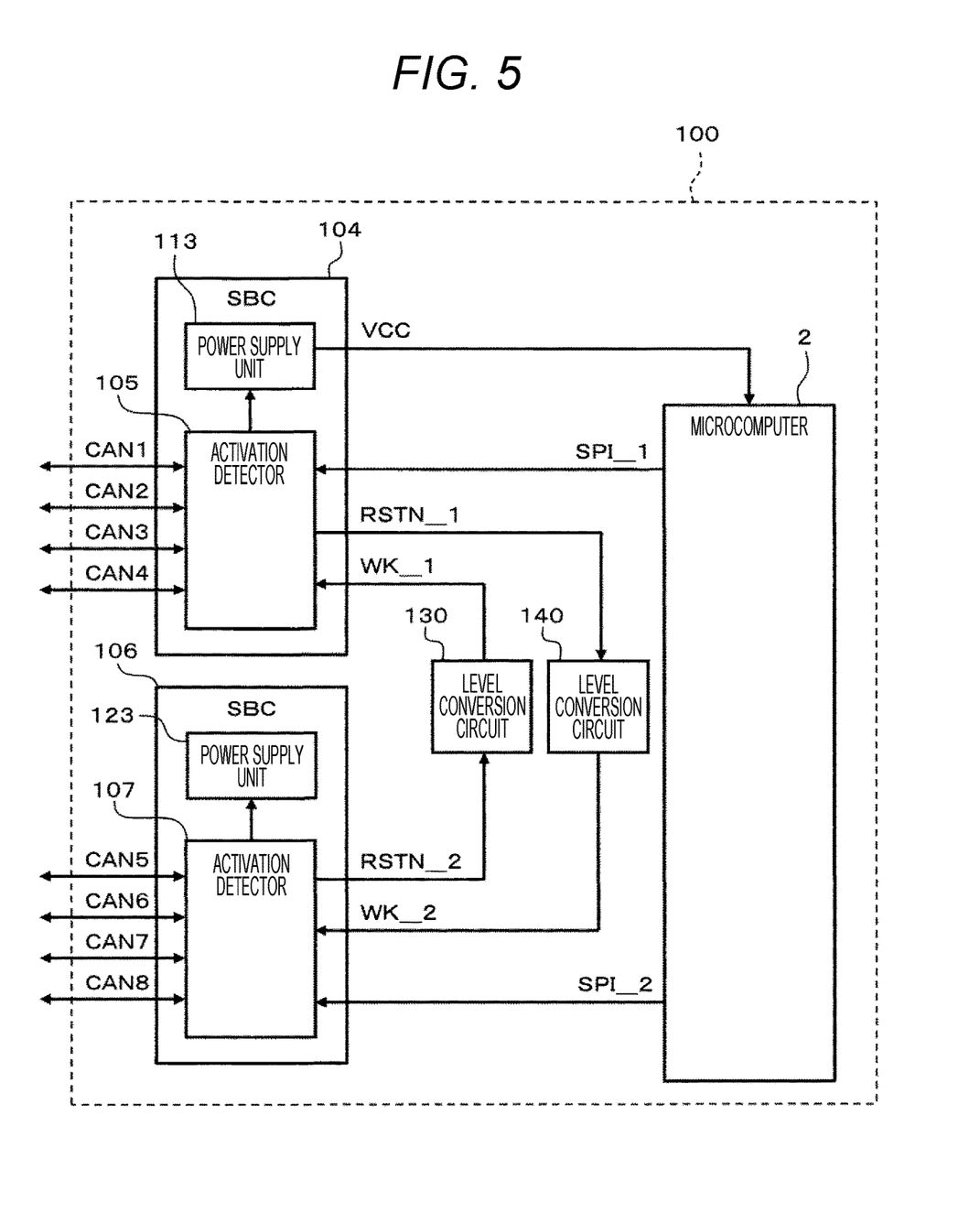
FIG. 5 is a functional block diagram schematically showing an overall configuration of a vehicle controller according to a first example.

FIG. 5 is a functional block diagram schematically showing an overall configuration of a vehicle controller according to the example.

In FIG. 5, a vehicle controller 100 is generally configured of a microcomputer (electronic control unit) 2 that communicates with other electronic control units (not shown) through multiple (e.g., eight) CAN channels (CAN1 to CAN8), and multiple (e.g., two) SBCs 104 and 106 that control communication related to the CAN channels (CAN 1 to CAN 8) of the microcomputer 2.

The SBC 104 controls communication of the microcomputer 2 through the CAN channels (CAN1 to CAN4), and the microcomputer 2 communicates with other electronic control units connected to the CAN channels (CAN1 to CAN4) through the active SBC 104. The SBC 104 has an activation detector 105 that detects a control start instruction signal (wakeup frame) input to the SBC 104 from the CAN channels (CAN1 to CAN4) and a communication controller activation instruction signal (WK_1) input to the SBC 104 from the SBC 106, and a power supply unit 113 that supplies power to the SBC 104 and is capable of supplying or cutting off operating power to the microcomputer 2.

When the activation detector 105 detects a wakeup frame from any of the multiple CAN channels (CAN1 to CAN4) or detects a rising edge of the communication controller activation instruction signal (after level conversion: WK_1), the activation detector 105 outputs an ON signal to the power supply unit 113, and changes the communication controller activation instruction signal (before level conversion: RSTN_1) from Lo level to Hi level. The power supply unit 113 starts power supply to the microcomputer 2 in response to an ON instruction from the activation detector 105.

The SBC 106 controls communication of the microcomputer 2 through the CAN channels (CAN5 to CAN8), and the microcomputer 2 communicates with other electronic control units connected to the CAN channels (CAN5 to CAN8) through the active SBC 106. The SBC 106 has an activation detector 107 that detects a control start instruction signal (wakeup frame) input to the SBC 106 from the CAN channels (CAN5 to CAN8) and a communication controller activation instruction signal (WK_2) input to the SBC 106 from the SBC 104, and a power supply unit 123 that supplies power to the SBC 106.

Note that power necessary for an operating state or a standby state (sleep state) is supplied to the power supply units 113 and 123 from a higher-level power supply unit (not shown).

When the activation detector 107 detects a wakeup frame from any of the multiple CAN channels (CAN5 to CAN8) or detects a rising edge of the communication controller activation instruction signal (after level conversion: WK_2 signal), the activation detector 107 outputs an ON signal to the power supply unit 123, and changes the communication controller activation instruction signal (before level conversion: RSTN_2) from Lo level to Hi level. The power supply unit 123 starts power output according to the communication controller activation instruction signal from the activation detector 105, but does not supply power to the microcomputer 2.

Level conversion circuits 130 and 140 for adjusting the signal voltage difference between the SBCs 104 and 106 are disposed in the communication channel of the communication controller activation instruction signal between the activation detector 105 and the activation detector 107. The level conversion circuits 130 and 140 are circuits for converting the signal level output from one of the SBCs 104 and 106 into a voltage value that can be input to the other of the SBCs 104 and 106. That is, the level conversion circuit 130 converts the communication controller activation instruction signal (before level conversion: RSTN_2) output from the SBC 106 into a communication controller activation instruction signal (after level conversion: WK_1) of a voltage value that can be input to the SBC 104, and inputs it to the SBC 104. Similarly, the level conversion circuit 140 converts the communication controller activation instruction signal (before level conversion: RSTN_1) output by the SBC 104 into a communication controller activation instruction signal (after level conversion: WK_2) of a voltage value that can be input to the SBC 106, and inputs it to the SBC 106.

Figure 6:
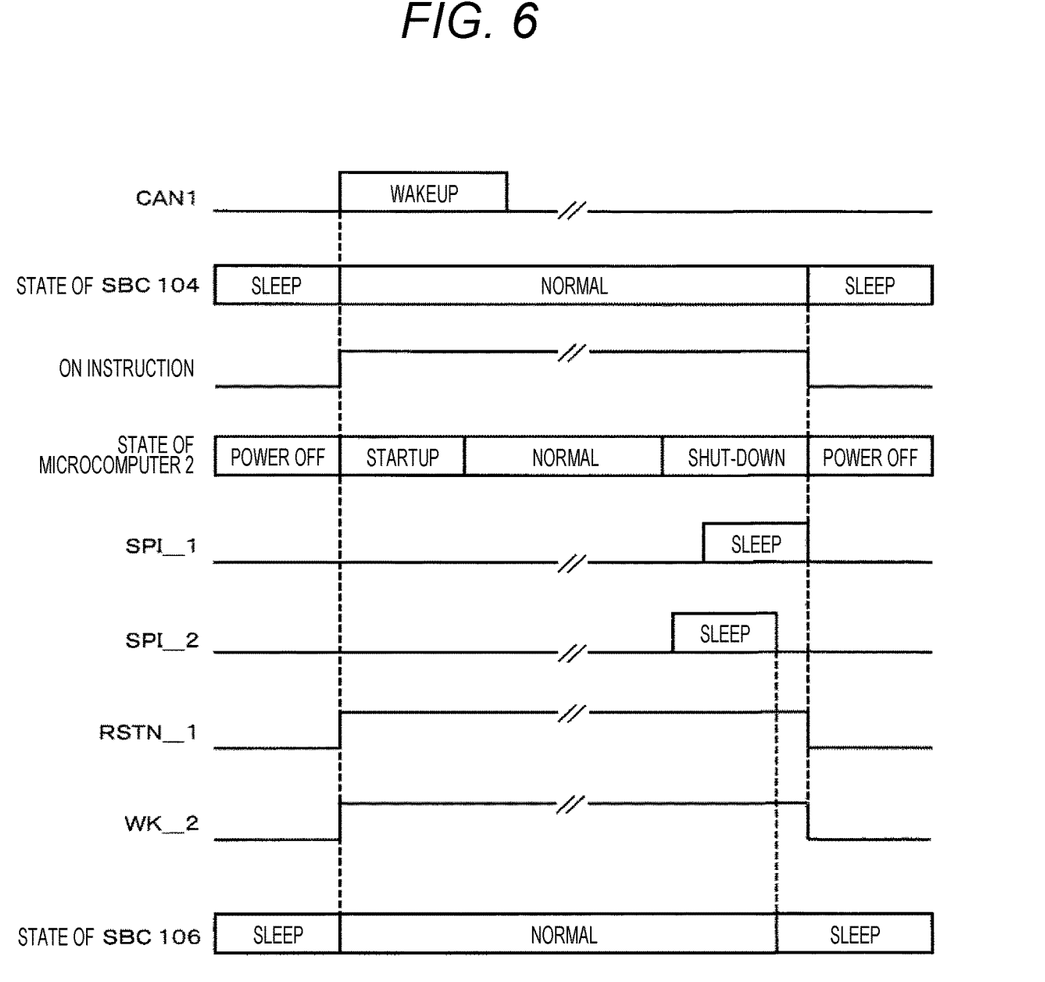
FIG. 6 is a timing chart showing an example of an operating state of the vehicle controller according to the first example.

FIG. 6 is a timing chart showing an example of an operating state of the vehicle controller according to the example.

As shown in FIG. 6, the activation detector 105 detects a wakeup frame in the CAN channel (CAN1), and the state of the SBC 104 transitions from sleep to normal, to wake up. Immediately after waking up, the activation detector 105 outputs an ON instruction to the power supply unit 113, and the power supply unit 113 starts power supply to the microcomputer 2. Moreover, in addition to the output of the ON instruction to the power supply unit 113, the activation detector 105 changes the communication controller activation instruction signal (RSTN_1) from Lo level to Hi level. The communication controller activation instruction signal (RSTN_1) is level-converted to a voltage on the SBC 106 side by the level conversion circuit 140, and is input to the activation detector 107 as a communication controller activation instruction signal (WK_2). When the communication controller activation instruction signal (WK_2) is input to the SBC 106, the state of the SBC 106 transitions from sleep to normal to wake up. Meanwhile, the microcomputer 2 whose power supply from the power supply unit 113 has been started finishes startup, transits to the normal state, and activation is completed.

The example configured as described above, too, can achieve effects similar to those of the embodiment of the present invention. That is, in the example, the SBC 106 can be activated promptly without waiting for completion of startup of the microcomputer 2. This can suppress increase in startup time due to increase in the number of function portions related to communication.

Note that while the example (FIG. 5) exemplifies and describes a configuration using two SBCs, the number is not limited, and similar control may be performed with a configuration using more SBCs than the example.

Second Example

A second example of the present invention will be described with reference to FIGS. 7 and 8. In the example, only differences from the first example will be described, and in the drawings used in the example, members similar to those of the first example are denoted by the same reference numerals, and the description thereof will be omitted.

The example shows a configuration example in which the falling edge detection scheme is adopted for the activation detector 107 of the first example.

Figure 7:
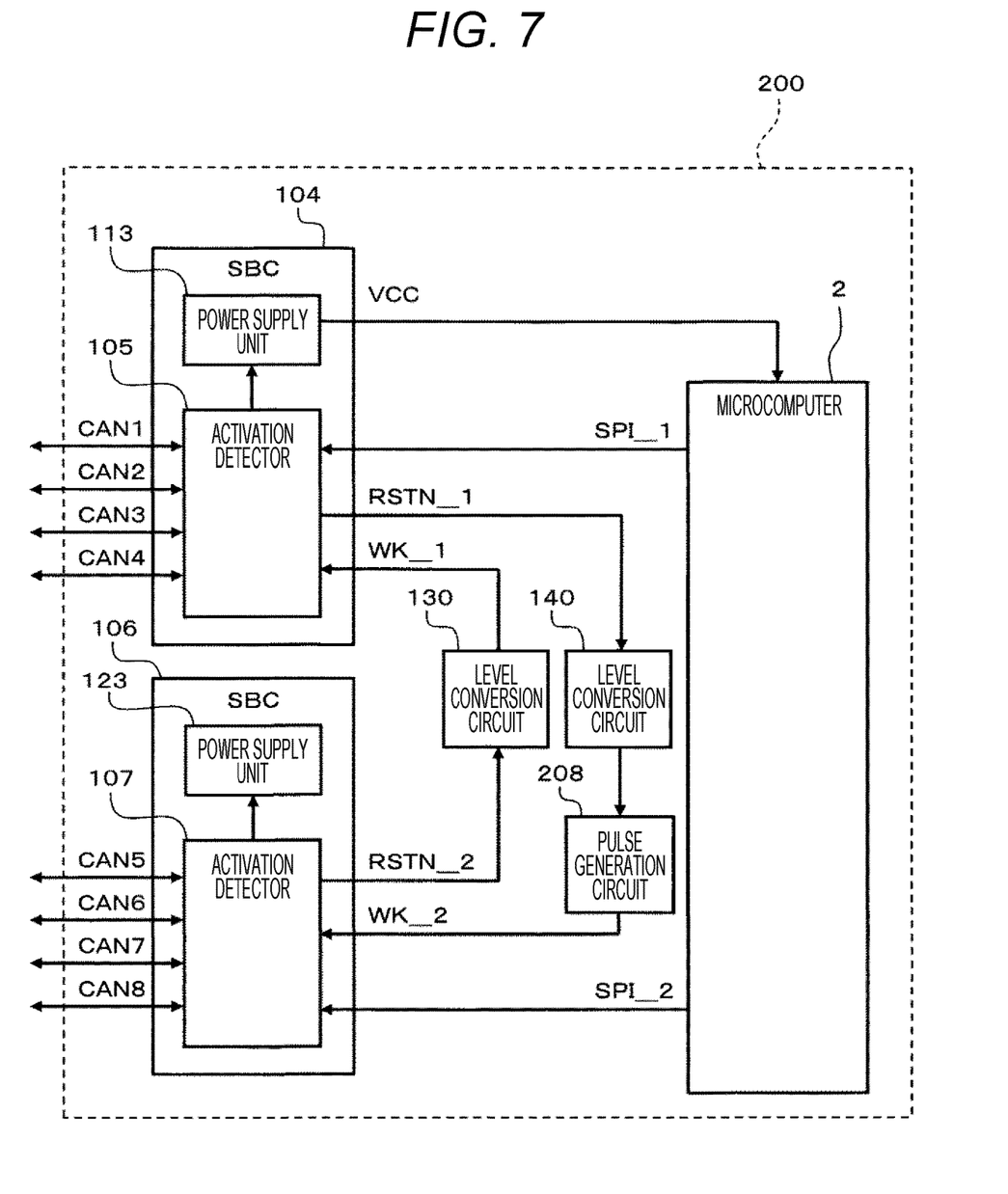
FIG. 7 is a functional block diagram schematically showing an overall configuration of a vehicle controller according to a second example.
Figure 8:
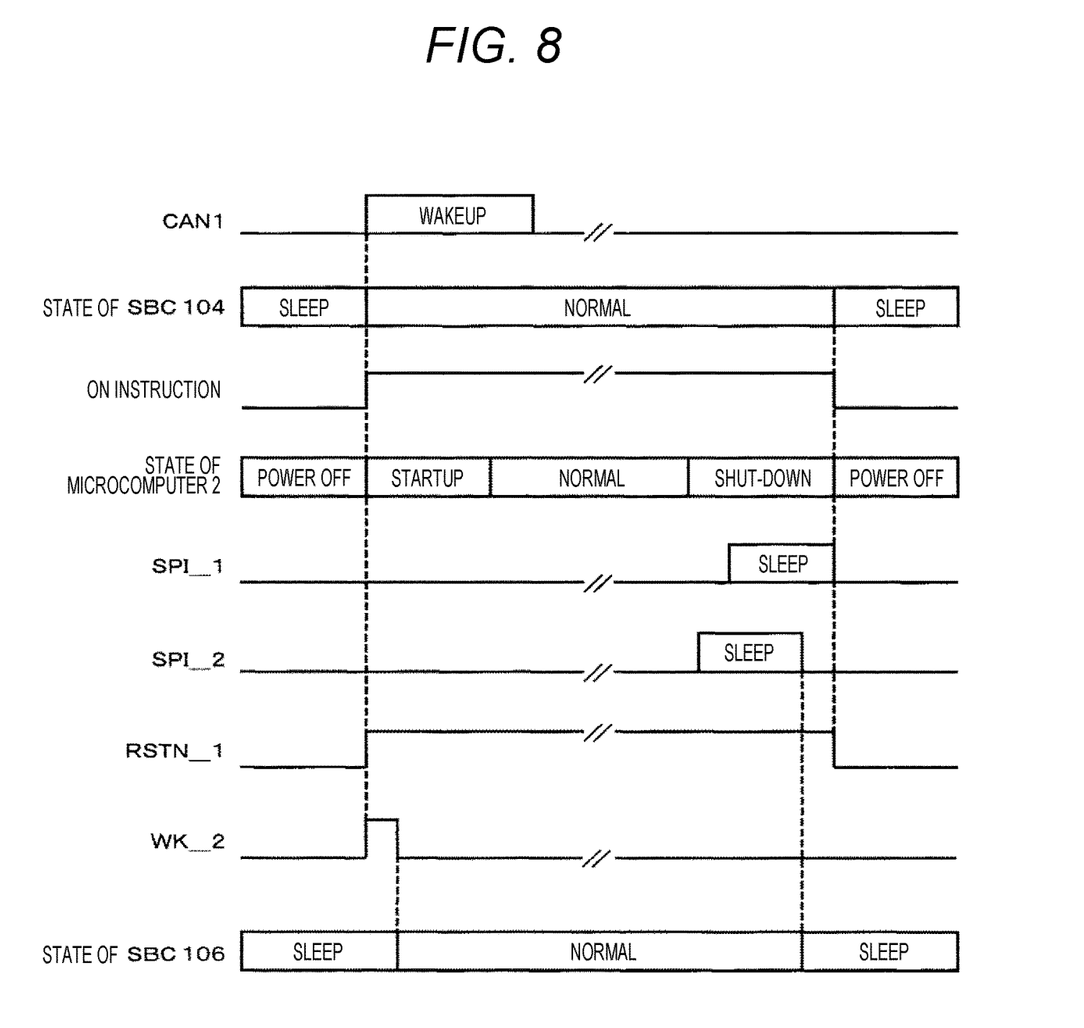
FIG. 8 is a timing chart showing an example of an operating state of the vehicle controller according to the second example.

FIG. 7 is a functional block diagram schematically showing an overall configuration of a vehicle controller according to the example. Additionally, FIG. 8 is a timing chart showing an example of an operating state of the vehicle controller according to the example.

As shown in FIG. 7, in a vehicle controller 200 of the example, a pulse generation circuit 208 is provided in a channel for transmitting a communication start instruction signal to an activation detector 107 of an SBC 106 from an activation detector 105 of an SBC 104 on the downstream side of the level conversion circuit 140, and a pulse signal (WK_2) generated by the pulse generation circuit 208 on the basis of the signal obtained by converting the communication start instruction signal (RSTN_1) from the activation detector 105 by the level conversion circuit 140 is detected by the activation detector 107.

Other parts of the configuration are similar to the first example.

The example configured as described above, too, can achieve effects similar to those of the first example. That is, in the example, the SBC 106 can be activated promptly without waiting for completion of startup of the microcomputer 2. This can suppress increase in startup time due to increase in the number of function portions related to communication.

Third Example

A third example of the present invention will be described with reference to FIGS. 9 and 10. In the example, only differences from the first embodiment will be described, and in the drawings used in the example, members similar to those of the first embodiment are denoted by the same reference numerals, and the description will be omitted.

The example shows a configuration example using multiple (e.g., two) CAN transceivers.

Figure 9:
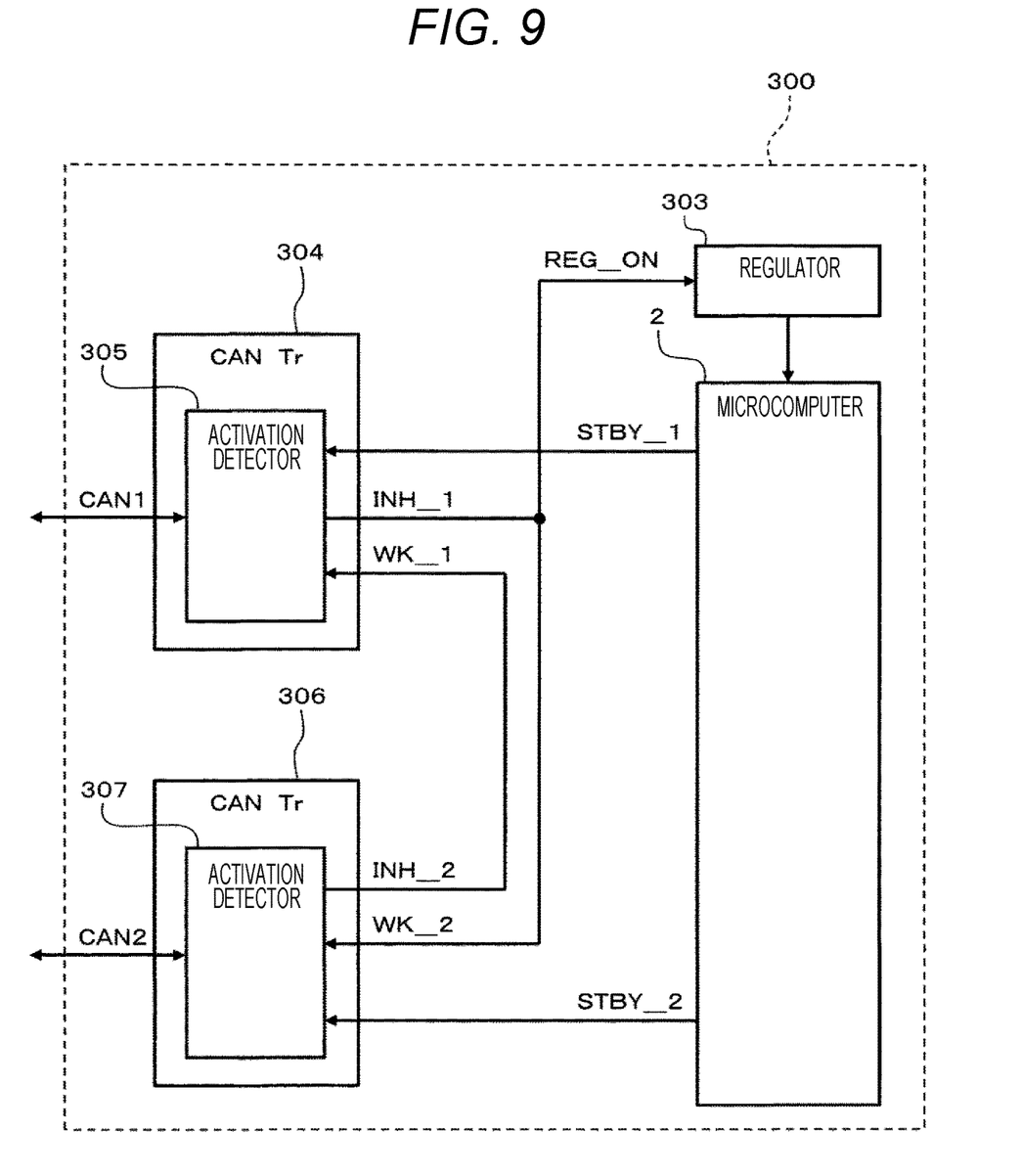
FIG. 9 is a functional block diagram schematically showing an overall configuration of a vehicle controller according to a third example.

FIG. 9 is a functional block diagram schematically showing an overall configuration of a vehicle controller according to the example.

In FIG. 9, a vehicle controller 300 is generally configured of a microcomputer (electronic control unit) 2 that communicates with other electronic control units (not shown) through multiple (e.g., two) CAN channels (CAN1, CAN2), a regulator 303 capable of supplying or cutting off operating power to the microcomputer 2, and multiple (e.g., two) CAN transceivers 304 and 306 respectively provided in the multiple CAN channels (CAN1, CAN2) used for communication of the microcomputer 2 to respectively control communication related to the CAN channels (CAN1, CAN2) of the microcomputer 2. Note that power necessary for an operating state or a standby state (sleep state) is supplied to the regulator 303 and the CAN transceivers 304 and 306 from a higher-level power supply unit (not shown).

The CAN transceiver 304 controls communication of the microcomputer 2 through the CAN channel (CAN1), and the microcomputer 2 communicates with another electronic control unit connected to the CAN channel (CAN1) through the active CAN transceiver 304. The CAN transceiver 304 has an activation detector 305 that detects a control start instruction signal (wakeup frame) input to the CAN transceiver 304 from the CAN channel (CAN1) and a communication controller activation instruction signal (WK_1) input to the CAN transceiver 304 from the CAN transceiver 306.

When the activation detector 305 detects a wakeup frame from the CAN channel (CAN1) or detects a rising edge of the communication controller activation instruction signal (WK_1), the activation detector 305 changes a signal (INH_1), which is output both as an ON signal (REG_ON) to the regulator 303 and a communication controller activation instruction signal (WK_2) to the CAN transceiver 306, from Lo level to Hi level to turn on the regulator 303 and activate the CAN transceiver 306. The regulator 303 starts power supply to the microcomputer 2 in response to an ON instruction from the activation detector 305.

The CAN transceiver 306 controls communication of the microcomputer 2 through the CAN channel (CAN2), and the microcomputer 2 communicates with another electronic control unit connected to the CAN channel (CAN2) through the active CAN transceiver 306. The CAN transceiver 306 has an activation detector 307 that detects a control start instruction signal (wakeup frame) input to the CAN transceiver 306 from the CAN channel (CAN2) and a communication controller activation instruction signal (WK_2) input to the CAN transceiver 306 from the CAN transceiver 304.

When the activation detector 307 detects a wakeup frame from the CAN channel (CAN2) or detects a rising edge of the communication controller activation instruction signal (WK_2), the activation detector 307 changes a signal (INH_2) output as a communication controller activation instruction signal (WK_1) to the CAN transceiver 304 from Lo level to Hi level to activate the CAN transceiver 304.

Figure 10:
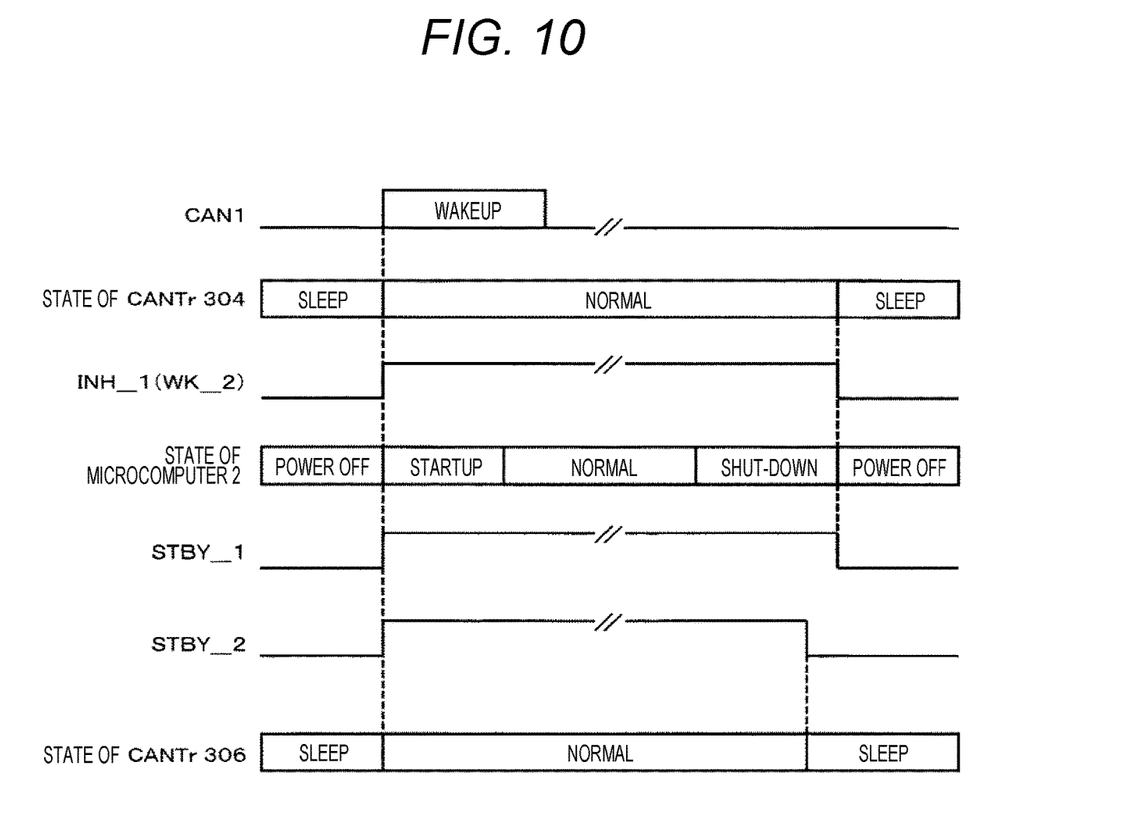
FIG. 10 is a timing chart showing an example of an operating state of a vehicle controller according to a fourth example.

FIG. 10 is a timing chart showing an example of an operating state of the vehicle controller according to the example.

As shown in FIG. 10, the activation detector 305 detects a wakeup frame in the CAN channel (CAN1), and the state of the CAN transceiver 304 transitions from sleep to normal, to wake up. Immediately after waking up, the activation detector 305 changes the signal (INH_1) from Lo level to Hi level to turn on (activate) the regulator 303, and the regulator 303 starts power supply to the microcomputer 2. Additionally, the signal (INH_1) signal is input to the activation detector 307 as the communication controller activation instruction signal (WK_2) of the CAN transceiver 306, and the state of the CAN transceiver 306 transitions from sleep to normal, to wake up. Meanwhile, the microcomputer 2 whose power supply from the regulator 303 been started finishes startup, transits to the normal state, and activation is completed.

The example configured as described above, too, can achieve effects similar to those of the embodiment of the present invention. That is, in the example, the CAN transceiver 306 can be activated promptly without waiting for completion of startup of the microcomputer 2. This can suppress increase in startup time due to increase in the number of function portions related to communication.

Note that while the example (FIG. 9) exemplifies and describes a configuration using two CAN transceivers, the number is not limited, and similar control may be performed with a configuration using more CAN transceivers than the example.

APPENDIX

Note that the present invention is not limited to the above-described embodiments, and includes various modifications. For example, the above embodiment has been described in detail for the sake of clarity of the present invention, and is not necessarily limited to the embodiment including all of the described configurations. Additionally, all or some of the configurations, functions, and the like described above may be implemented by designing an integrated circuit, for example. Additionally, each configuration, function, and the like described above may be implemented by software by a processor interpreting and executing a program that implements each function.

REFERENCE SIGNS LIST 1, 10, 20, 100, 200, 300 vehicle controller
2 microcomputer (electronic control unit)
2 microcomputer
3 power supply unit
4, 6, 40, 60 communication controller
5, 7, 50, 70, 105, 107, 305, 307 activation detector
8 pulse generation circuit
113, 123 power supply unit
130, 140 level conversion circuit
303 regulator
304, 306 CAN transceiver

The invention claimed is:

1. A vehicle controller comprising:
an electronic control unit that communicates with other electronic control units through multiple channels;
a power supply unit that is capable of supplying or shutting off operating power to the electronic control unit; and
multiple communication controllers that are provided in the respective plurality of channels used for communication of the electronic control unit and each control communication related to the channels of the electronic control unit, the multiple communication controllers comprising respective activation detectors, wherein when a first communication controller which is one of the multiple communication controllers receives a control start instruction signal instructing activation of the electronic control unit through a channel related to the first communication controller, the first communication controller switches a state of the first communication controller from a standby state with a limited function to an operating state, transmits, to the power supply unit, a power source activation instruction signal instructing switching of a supply state of the operating power to the electronic control unit from shut-off to supply, and outputs a communication start instruction signal instructing switching from the standby state to the operating state to another communication controller different from the first communication controller among the multiple communication controllers, and when the first communication controller receives a communication standby instruction signal through a channel related to the first communication controller, a first activation detector, which is one of the respective activation detectors, outputs the communication standby instruction signal to another activation detector different from the first activation detector to switch the another communication controller into a standby state while the first communication controller remains in the operating state.

2. The vehicle controller according to claim 1, wherein when a second communication controller which is one of the other communication controllers different from the first communication controller receives a control start instruction signal through a channel related to the second communication controller, the second communication controller switches a state of the second communication controller from the standby state to the operating state, and transmits a communication start instruction signal to the first communication controller, and the first communication controller switches the state of the first communication controller from the standby state to the operating state on a basis of the received communication start instruction signal, and transmits the power source activation instruction signal to the power supply unit.

3. The vehicle controller according to claim 1, wherein the power source activation instruction signal transmitted from the first communication controller to the power supply unit and the communication start instruction signal transmitted from the first communication controller to the other communication controller are a common signal.

* * * * *